Dec. 23, 1941.　　　　R. A. ACKLEY　　　　2,266,839

INTEGRATING DEVICE

Filed July 28, 1939　　　　2 Sheets-Sheet 1

Inventor
Robert A. Ackley
by McCurdy Dawson & Booth
Attorneys

Dec. 23, 1941.  R. A. ACKLEY  2,266,839
INTEGRATING DEVICE
Filed July 28, 1939  2 Sheets-Sheet 2

Inventor
Robert A. Ackley
by McConkey Dawson & Booth
Attorneys

Patented Dec. 23, 1941

2,266,839

UNITED STATES PATENT OFFICE 2,266,839

INTEGRATING DEVICE

Robert A. Ackley, Chicago, Ill., assignor to Republic Flow Meters Company, Chicago, Ill., a corporation of Illinois Application July 28, 1939, Serial No. 287,069

8 Claims. (Cl. 74—1)

This invention relates to integrating devices and more particularly to mechanical integrators of the type employed, for example, to integrate the flow through a conduit over a period of time.

Integrating devices as heretofore employed have generally included a cam set by some sensitive means and a feeler periodically moved toward and away from the cam. In these devices it has been necessary to employ a brake of some sort to hold the cam against displacement by the feeler and inaccuracies have been introduced due to the fact that the feeler remained in engagement with the cam for different intervals in different cam positions. The present invention has for an object the elimination of these disadvantages and the provision of a simple and efficient integrating mechanism.

One of the objects of the invention is to provide an integrating device in which the necessity of employing a brake on the cam is eliminated.

Another object of the invention is to provide an integrating device in which the feeler engages the cam a substantially constant amount of time regardless of the position thereof. According to one important feature the rest period of the feeler occurs when it is against a fixed stop and it is periodically released for a predetermined constant time to allow it to move into engagement with the cam.

Still another object of the invention is to provide a periodic driving and releasing means for the feeler which is simple in construction and positive and reliable in action without interfering with sensitivity of the feeler and cam.

The above and other objects and advantages of the invention including novel sub-combinations and desirable structural features will be apparent from the following description of the embodiment illustrated in the accompanying drawings, in which.

Figure 1:
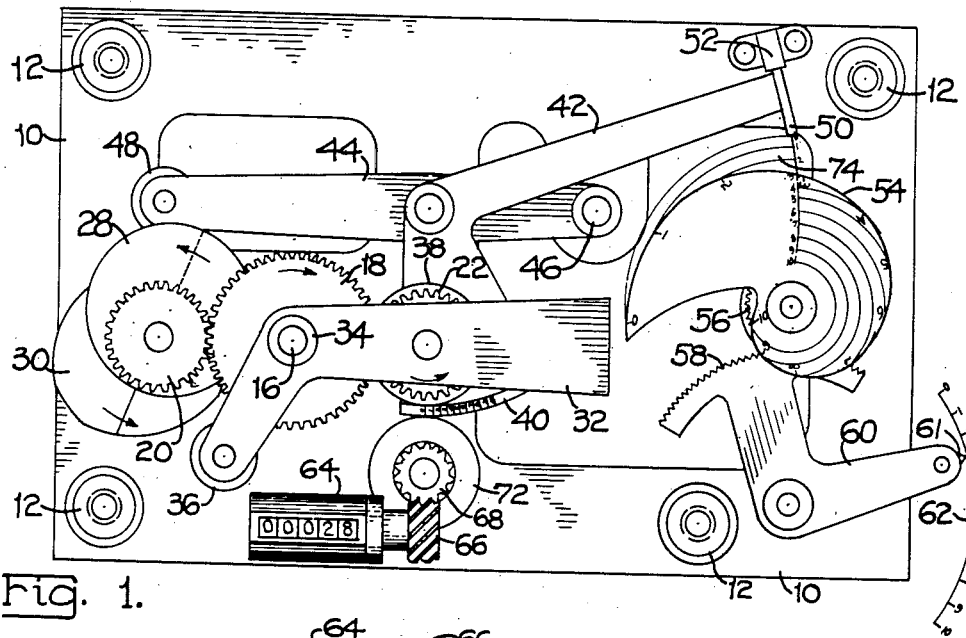
Figure 1 is an elevation of an instrument embodying the invention with the front plate removed.
Figure 2:
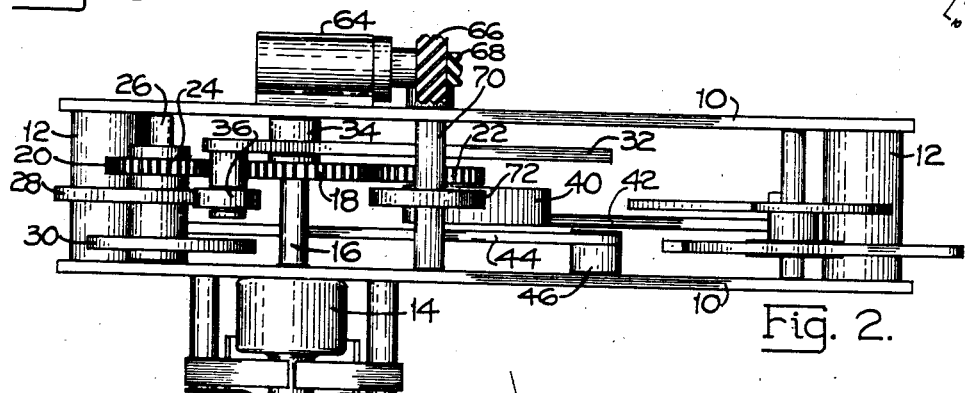
Figure 2 is a bottom view of Figure 1.

The illustrated instrument comprises front and back plates 10 secured together by posts 12 and providing a supporting framework adapted to be mounted on a panel or in a casing as desired. A motor 14 is secured to the back plate and has its shaft 16 projecting forwardly and journalled in the front plate. The motor is preferably a constant speed type such as a synchronous motor.

A gear 18 is rigidly secured to the shaft 16 and meshes with two pinions 20 and 22. The pinion 20 is carried by a sleeve 24 rotatable on a rod 26 which is mounted between the plates 10. Two cams 28 and 30 are secured to the sleeve 24 to be turned thereby as the pinion 20 is driven.

The pinion 22 is rotatably mounted on a lever 32 which has a hub portion 34 rotatable on the rod 16. A roller 36 rotatably carried by the end of lever 32 engages the cam 28 so that this cam will swing the arm 32 around its pivot. A friction wheel 38 connected to the gear 22 engages an arcuate flange 40 on a feeler 42 which is pivotally mounted on an arm 44. The arm 44 is pivoted at one end on a fixed pivot 46 and at its other end carries a roller 48 which rides on the cam 30.

At one end the feeler 42 carries a pin or blade 50 which is movable between a fixed stop 52 and a rotatable cam 54. As shown, the cam 54 is arranged to turn through substantially one complete revolution and is formed with a gradual rise so that the pin 50 will always engage it at a small angle to the normal. Preferably this angle is such that its tangent is less than the coefficient of friction so that the pin has no tendency to turn the cam. However, this is not essential since the pin engages the cam with a very light force due to the action of gravity on the unbalanced weight of the feeler.

The cam is adapted to be turned in proportion to variations in a condition to be integrated. As shown, a pinion 56 on the cam meshes with a gear segment 58 on one arm of a bell crank lever 60. The other arm of the bell crank lever is connected to an instrument, not shown, sensitive to the condition to be integrated and may, if desired, be provided with a pointer 61 movable over a scale 62 to indicate the instantaneous value of the condition. One example of an instrument with which the integrator may be used is a fluid flowmeter in which case the usual float would be linked to the lever 60.

The integrated value is shown on a counter 64 secured to the front of the instrument and driven by a worm gear 66. The gear 66 meshes with a worm 68 on the end of a shaft 70 which carries a friction driven wheel 72 engageable with the flange 40.

Figure 3:
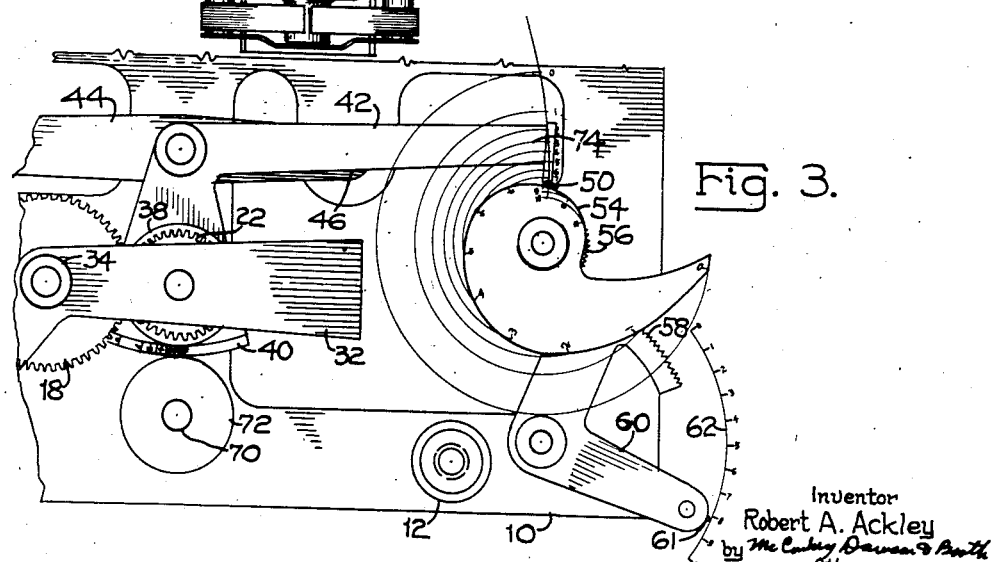
Figure 3 is a partial view similar to Figure 1 showing the parts in a different position.

In use when the value of the condition is such as to move pointer 61 to the number 3 on scale 62, the cam 54 will be turned to bring the point marked 3 thereon under the pin 50. This will permit the pin 50 to drop to the line marked 3 on the scale 74. It will be understood that the scale 74 and the markings on the cam are not ordinarily provided on commercial instruments, being shown on Figures 1 and 3 only for explanatory purposes.

Figure 4:
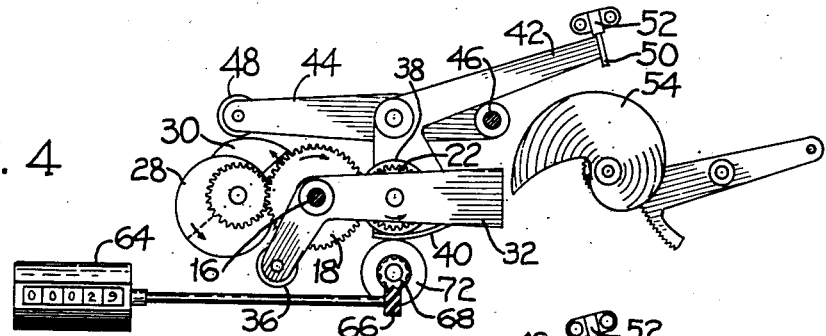
Figures 4 to 8 are diagrammatic views showing the parts in a series of different positions throughout an operating cycle.

Figures 1 and 4 illustrate the position of the parts at the end of an integrating cycle with flange 40 in engagement with both wheels 38 and 72 and cams 28 and 30 out of engagement with the rollers 36 and 48. At this time the wheel 38 has driven the feeler counterclockwise about its pivot to move pin 50 into engagement with the stop, thereafter slipping on flange 40 and holding the pin in engagement with the stop. It will be noted that the pinion 22 is turned in such a direction that the driving pressure on its teeth tends to press the wheel 38 into driving engagement with the flange 40.

Figure 5:
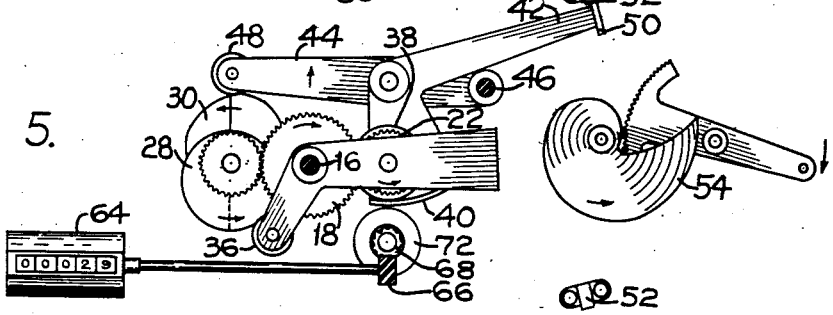
Figure 6:
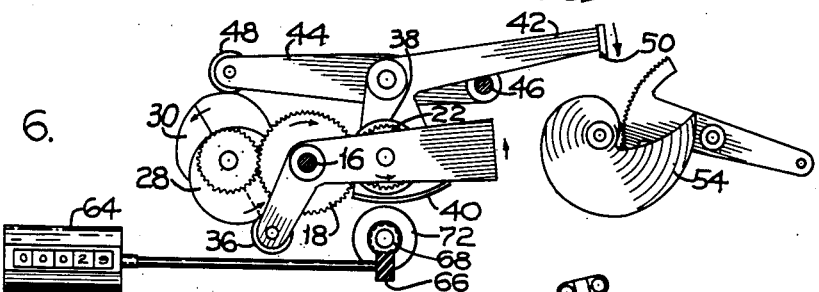

As the operation continues the cam 30 will engage roller 48 and raise the arm 44 to lift flange 40 out of engagement with the driven wheel 72. This position is shown in Figure 5. Upon continued rotation the cam 28 engages roller 36 and rocks the lever 32 to raise the wheel 38 out of engagement with the flange 40. At this time with the parts in the position of Figure 6 the feeler is free and swings by gravity in a clockwise direction until the pin 50 strikes the cam 54, the amount of movement of the feeler being limited by the position of the cam.

The feeler may be balanced so as to strike the cam with a very light force and since the angle between the feeler and cam is very small there will be no tendency to turn the cam. Therefore, the usual brake provided to hold the cam during engagement by the feeler may be eliminated and the cam may be left free to be turned by the instrument at any time.

Figure 7:
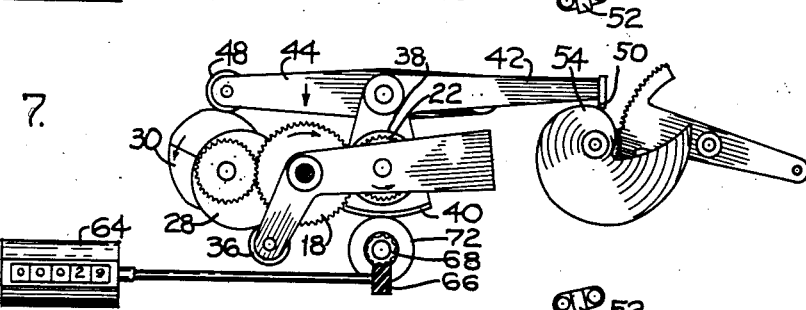
Figure 8:
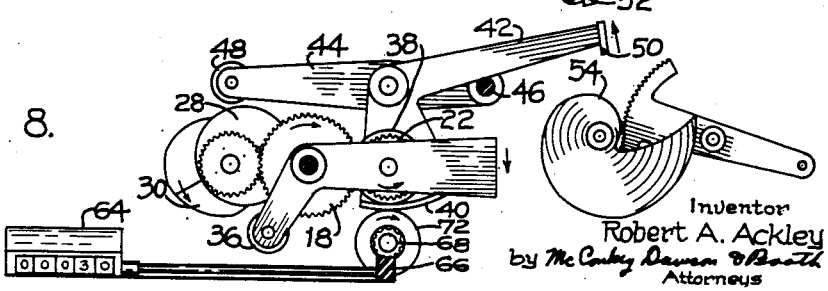

Further movement brings the parts into the position of Figure 7 in which the cam 30 has lowered the arm 44 to bring the flange 40 into engagement with the driven roller 72. Thereafter the cam 28 releases the lever 32 to permit the driving wheel 38 to engage the flange 40 as shown in Figure 8. The driving wheel at this time rocks the feeler counterclockwise to bring pin 50 into engagement with the stop 52. At the same time flange 40 drives the driven wheel an amount proportional to the motion of the feeler to turn up the counter 64. It will be understood that the cam 54 may be so shaped as to move the counter in proportion to any desired function of the pointer motion. For example, in the case of a flowmeter the cam 54 may be shaped according to a square root curve.

It will be noted that the rest period of the feeler occurs while it is in engagement with the stop 52 and that it is released for a constant amount of time during each cycle. Thus the feeler pin will engage the cam for a substantially constant amount of time during each cycle, variable only by the negligible difference in time required for it to drop through slightly different distances from the stop to the cam. Even if the feeler should have some slight effect on the cam, as when a steep cam is required to obtain some particular function, the effect would therefore be constant and could be compensated for in calibrating the integrator. This arrangement further leaves the cam entirely free during the major part of the operating cycle so as not to interfere with the sensitivity of the instrument.

It will be understood that various changes might be made in the illustrated integrator and that the particular construction shown is not to be taken as a definition of the scope of the invention. For this purpose reference will be had to the appended claims.

What is claimed is:

1. In a device of the character described having a differentially adjustable cam and a feeler therefor, a stop to limit movement of the feeler away from the cam, means for driving said feeler into engagement with the stop, means for periodically releasing the feeler for a predetermined constant amount of time to allow it to move into engagement with the cam and to remain in engagement with the cam a constant interval of time regardless of the position thereof, and a member driven during movement of the feeler from the cam to the stop.

2. In a device of the character described having a differentially adjustable cam and a feeler therefor, a stop to limit movement of the feeler away from the cam, friction driving means engaging the feeler to move it into engagement with the stop, cam means for periodically disengaging the driving means from the feeler for a predetermined constant amount of time to allow the feeler to move into engagement with the first named cam, and a member driven during movement of the feeler from the cam to the stop.

3. In an integrating device of the type including a member moved in proportion to variations in a condition to be integrated, a cam connected to said member to be moved thereby, and a pivotally mounted feeler having one end movable into engagement with the cam, the combination of a stop to limit movement of the feeler away from the cam, a member connected to the feeler having an arcuate driving portion, a friction drive wheel engageable with said portion to move the feeler into engagement with the stop, and means for periodically moving said drive wheel out of engagement with the driving portion for a predetermined constant time interval to allow the feeler to move into engagement with the cam.

4. In an integrating device of the type including a member moved in proportion to variations in a condition to be integrated, a cam connected to said member to be moved thereby, and a pivotally mounted feeler having one end movable into engagement with the cam, the combination of a stop to limit movement of the feeler away from the cam, a member connected to the feeler having an arcuate driving portion, a friction drive wheel engageable with said portion to move the feeler into engagement with the stop, a friction driven wheel engageable with said portion, and means for periodically disengaging both of said friction wheels from said driving portion to allow the feeler to move into engagement with the cam.

5. In an integrating device of the type including a member moved in proportion to variations in a condition to be integrated, a cam connected to said member to be moved thereby, and a pivotally mounted feeler having one end movable into engagement with the cam, the combination of a stop to limit movement of the feeler away from the cam, a member connected to the feeler having an arcuate driving portion, a friction drive wheel engageable with said portion to move the feeler into engagement with the stop, a friction driven wheel engageable with said portion, and control means for first moving said driven wheel and portion out of engagement, second moving said portion and driving wheel out of engagement to allow the feeler to move into engagement with the cam, third reengaging said portion and driven wheel, and finally reengaging said portion and driving wheel to move the feeler into engagement with the stop and to drive the driven wheel an amount proportional to movement of the feeler.

6. In an integrating device of the type including a member moved in proportion to variations in a condition to be integrated and a cam connected to said member to be driven thereby, the combination of a pivotally mounted arm, a feeler pivoted to said arm and having at one end a portion engageable with said cam, a stop to limit movement of said portion away from the cam, a pivoted lever, a friction driving wheel carried by said lever and engageable with the feeler to move it into engagement with the stop, a friction driven wheel engageable with the feeler to be driven thereby, and means for periodically moving said arm and said lever to disengage said friction wheels from the feeler.

7. In an integrating device of the type including a member moved in proportion to variations in a condition to be integrated and a cam connected to said member to be driven thereby, the combination of a pivotally mounted feeler having at one end a portion engageable with said cam, a stop to limit movement of said portion away from the cam, a pivoted lever, a friction driving wheel carried by said lever and engageable with the feeler to move it into engagement with the stop, and means for periodically moving said lever to disengage said friction wheel from the feeler.

8. In an integrating device of the type including a member moved in proportion to variations in a condition to be integrated and a cam connected to said member to be driven thereby, the combination of a pivotally mounted arm, a feeler pivoted to said arm and having at one end a portion engageable with said cam, a stop to limit movement of said portion away from the cam, a driving gear, a lever pivoted coaxially with said gear, a friction driving wheel on said lever engageable with said feeler and carrying a gear meshing with said driving gear, a friction driven wheel engageable with said feeler, and cam means driven by said driving gear for rocking said arm and said lever periodically to disengage the driving and driven wheels from the feeler.

ROBERT A. ACKLEY.